United States Patent [19]

Laing et al.

[11] 4,170,879

[45] Oct. 16, 1979

[54] METHOD AND SYSTEM FOR UTILIZING WASTE HEAT GENERATED IN THERMAL ELECTRIC POWER STATIONS

[76] Inventors: Nikolaus Laing; Ingeborg Laing; Oliver Laing, all of Hofener Weg 35-37, D 7141 Aldingen, Fed. Rep. of Germany

[21] Appl. No.: 803,952

[22] Filed: Jun. 6, 1977

[30] Foreign Application Priority Data

Jan. 14, 1977 [AT] Austria .................................. 205/77

[51] Int. Cl.$^2$ .......................... F01K 17/02; F01K 3/00
[52] U.S. Cl. .................................. 60/648; 60/39.18 B; 60/652; 60/659; 60/693; 60/677; 237/13
[58] Field of Search .................. 60/39.18 B, 648, 652, 60/659, 677, 693; 237/12.1, 13

[56] References Cited

U.S. PATENT DOCUMENTS

| | | | |
|---|---|---|---|
| 3,681,920 | 8/1972 | Margen | 60/652 |
| 3,890,787 | 6/1975 | Margen | 60/648 |

Primary Examiner—Allen M. Ostrager
Attorney, Agent, or Firm—Pennie & Edmonds

[57] ABSTRACT

In a thermal power station installation the waste heat of the last stage is utilized by storing the cooling water which receives this waste heat, and heating it further during the periods during which the installation is not on full load, whereafter it is supplied to the grid of a remote area heating system.

8 Claims, 2 Drawing Figures

METHOD AND SYSTEM FOR UTILIZING WASTE HEAT GENERATED IN THERMAL ELECTRIC POWER STATIONS

REFERENCE TO OTHER APPLICATIONS

The method and structure of the present application may utilize improvements disclosed in our co-pending application Ser. No. 860,191 filed Dec. 15, 1977 which is a continuation of our application Ser. No. 616,256 filed Sept. 24, 1975, now abandoned.

BACKGROUND OF THE INVENTION

This invention relates to a method of producing heat for an area heating system remote from a thermal electric power station and to said power station for performing the said method.

Power stations used for remote area heating have the disadvantage that the efficiency drops owing to the elevated condensation temperature, so that the power yield for any given primary energy consumption is considerably less than in the case of conventional power stations. Since the temperature gradient in nuclear power stations is less than in fossil fired power stations, this advantage is particularly pronounced in the former.

The object of the invention is the utilisation of the waste heat from power station installations used for remote area heating, in which the efficiency of such installations is not subject to any load-dependent reduction.

The invention fulfils this object in a method of producing remote heat in power station installations, in which waste heat appears at a different temperature in dependence on the electric power generated, in that firstly the return water from the remote heating grid is subjected to the waste heat which is given off at a low temperature, that thereafter this water is stored and that finally this water is heated further by waste heat given off at a higher temperature and supplied to the inlet to the remote heating grid.

One way of performing this method is to utilize a multi-stage turbine which has at least one steam discharge between adjacent stages of the turbine and to provide a condenser downstream of the steam discharge. A further steam discharge is located downstream of the last stage of the turbine with a second condenser connected thereto. A water storage vessel is provided to which the cooling water of the second condenser is admitted during the period of peak load and from which the cooling water stream for the first condenser is withdrawn during the off-peak load period.

A further embodiment consists in that in power station installations, consisting of a base-load steam turbine installation with a condenser and a peak-load generator with a gas engine, e.g. a gas turbine, the latter being, if desired, arranged spatially separate from the former, the invention is seen in taking the input to the remote heating grid through a condenser and thereafter supplying it to a storage vessel from which the water for receiving the waste heat from the gas engine is withdrawn and supplied to the input to the remote heating grid.

In each case the quantity of water required for disposing of the heat is intermediately stored in a storage tank located in the vicinity of the power station. This storage tank is, for example, charged in the course of the day with water which has been pre-heated by condensation of the fully de-energised steam. During the night, during which in any case the electricity demand is less than during the day, the turbine unit is run at a lower energy level. The steam which has been tapped off is supplied to the condenser, which is now cooled by the water which has already been heated during the day, the water which has been preheated during the day being heated up to the required temperature at which it is utilised in the remote heating grid. The cooling water is discharged during the night preferably at an intermediate level of the storage vessel, whereas the fully heated water is returned in the upper region of the storage vessel. Preferably a device is provided at an intermediate level which discharges the water of that layer which has the correct temperature for any particular requirement. During the night the water volume which has been heated during the day and which has been stored at an intermediate temperature, is used up, and the vacated storage volume is again recharged by cold return water from the remote heating grid.

The invention will now be described with reference to the drawings.

DETAILED DESCRIPTION OF THE PREFERRED EMBODIMENT

Figure 1:
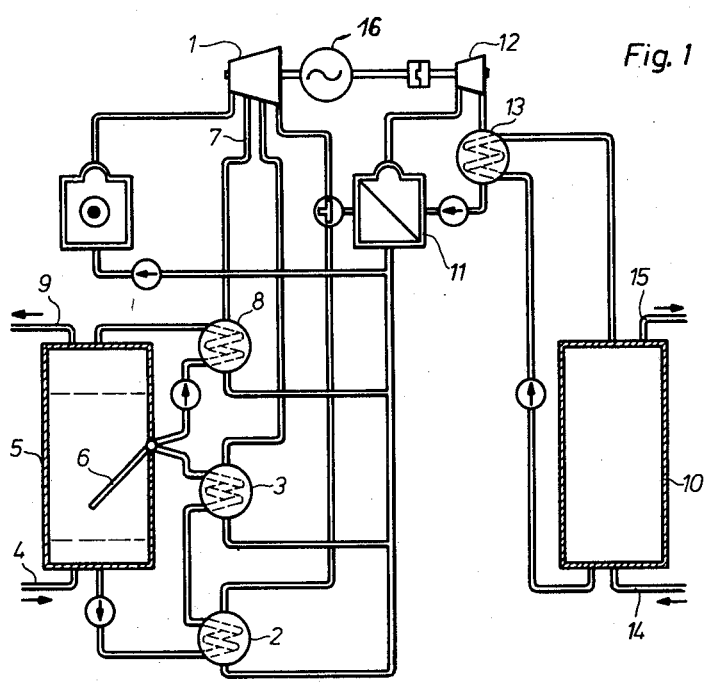
FIG. 1 shows a schematic diagram of a power station installation embodying the invention, having several turbine stages.

From the power station turbine 1 shown in FIG. 1 the fully de-energised steam passes into the condenser 2. A stream of somewhat less de-energised steam is condensed in a further condenser 3. From the return conduit 4 of the remote heating grid cold water reaches the storage vessel 5 and enters it at its lowest point. At an intermediate level a pivotable pipe 6 is arranged, through which the heated cooling water can be admitted at a level comprising that layer which coincides as accurately as possible with the cooling water temperature. During the day the supply of cold water which has entered during the night flows through the condensers 2 and 3, almost the entire volume of the storage vessel 5 being charged with heated cooling water in the evening. During the night relatively hot tapped-off steam is removed from the power station turbine 1 through the conduit 7. This steam is condensed in the condenser 8. In addition the heated cooling water is discharged from the interior of the storage vessel 5 through the pivotable pipe 6, heated to the remote heating temperature, and admitted to the upper part of the storage vessel, whence part of it is discharged to the input to the remote heating grid 9. The following morning the heating water supply of the previous day has been consumed, the lower half of the storage vessel 5 is filled with cold water fed in from the input 4, and the upper half with hot water which is conducted to the remote heating grid 9. Thereafter the next day's cycle commences.

A further increase in efficiency and output for the brief periods of peak demand can, in accordance with the invention, be achieved by providing a further storage vessel 10 which is provided either upstream of the return conduit 4 or through which cold tap water is passed. During these peak periods the waste steam from the turbine 1 is supplied to the evaporator 11 which, in operative association with the turbine 12 and the condenser 13, forms a low-temperature secondary circuit containing a low-boiling point working fluid. During the brief operational phase during the load peaks, the turbine 12 is also coupled to the generator 16. For disposing of the heat of condensation at a low temperature the content of the storage vessel 10 is conducted through the condenser 13. The large scale stream of cold water which passes through the storage vessel 10 between the inlet 14 and the outlet 15 is heated up by a few K.

Figure 2:
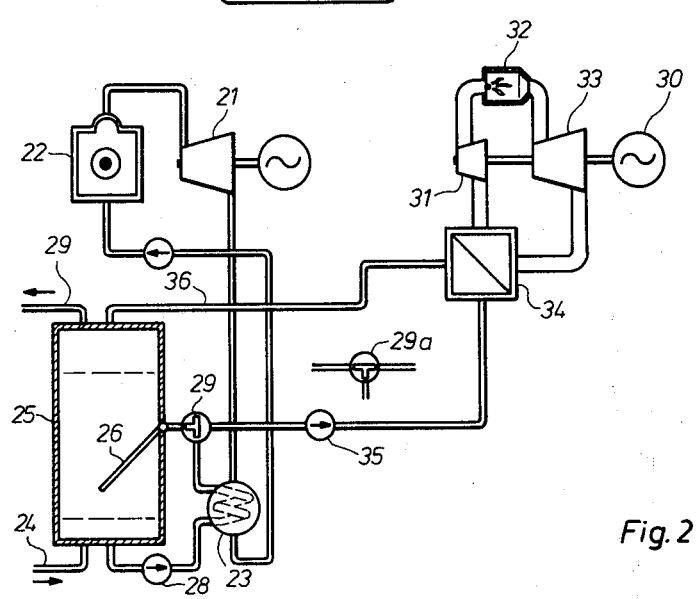
FIG. 2 shows a schematic diagram of a power station installation embodying the invention having a base-load steam turbine and a peak-load gas turbine.

The embodiment shown in FIG. 2 the turbine 21 generates the base load. The nuclear reactor 22 continuously supplies a constant stream of heat. The condensation takes place in the condenser 23. Through the conduit 24 the return flow of remote heat enters the storage vessel 25 at the bottom and is supplied to the condenser 23 by the pump 28 and is then admitted to the intermediate region of the storage vessel 25 via the three-way valve 29 and via the pipe 26 which is pivotable to different levels.

For generating peak loads an independent gas turbine installation (or a Diesel engine) is provided, which drives the generator 30.

The gas which has been compressed by the compressor 31 flows through the heating device 32, thence through the gas turbine 33 and, after being de-energised, through the heat exchanger 34. During peak load operation the heat exchanger 34 is, by means of the pump 35, supplied with hot water, which, upon rotation of the three-way valve 29 into the position 29a, originates partly from the condenser 23 and partly from the storage vessel 25. The water which has been heated in the heat exchanger 34 to the required remote heat temperature is admitted through the conduit 36 to the upper region of the storage vessel 25, and thence enters the input to the remote heating grid 29.

We claim:

1. A method of producing heat for an area heating system remote from a thermal electric power station, the latter generating waste heat at different temperatures depending on the electrical load supplied by the power station at any one time, wherein water returned to the power station from said remote area heating system is first subjected to said waste heat which is generated at a relatively low temperature, said water is thereafter stored and later heated further by means of waste heat generated by said power station at a higher temperature and then fed back to said heating system.

2. A thermal electric power station for generating electricity and useful heat for transfer to an area heating system removed from said power station; said power station comprising a multi-stage turbine, an electric generator coupled to and being driven by said turbine, at least one first steam discharge outlet between adjacent stages of said turbine, a first condenser connected downstream of said first discharge outlet, at least one second steam discharge outlet downstream of a last stage of said turbine, a second condenser connected downstream of said second discharge outlet, and a condenser cooling water storage vessel connected to said heating system and to the first and second condensers whereby during a period of peak load on said power station cooling water is prevented from flowing into said vessel from said first condenser and is allowed to flow into said vessel from said second condenser and during a period of off peak load on said power station cooling water is prevented from flowing into said vessel from said second condenser and is allowed to flow into said vessel from said first condenser.

3. A power station according to claim 2 having in addition a pipe having an open end extending into said vessel and having an opposite end adopted to connect with the inlet of said first condenser and with the outlet of said second condensor and with the open end of said pipe being movable vertically within the vessel.

4. A power station according to claim 2 including a further steam condenser connected downstream of said second condenser in the direction of flow of cooling water through said second condenser whereby steam which has been fully de-energised by said turbine is condensed in said first condenser and which has been partially de-energised by said turbine is condensed in said further condenser.

5. A power station according to claim 2 having in addition an auxiliary steam turbine, an auxiliary power generator coupled to and driven by said auxiliary steam turbine, a closed secondary working fluid circuit containing a low-boiling point working fluid connected with said auxiliary steam turbine, an evaporator in said circuit for evaporating said working fluid, an auxiliary condenser in said circuit for condensing said working fluid, and a further storage vessel connected to said heating system and having a cooling water inlet and discharge means connected to said auxiliary condenser and means for putting said further storage vessel into operation intermittently in order to receive the heat of condensation of said working fluid when condensed in said auxiliary chamber.

6. A thermal electric power station for generating electricity and useful heat for transfer to an area heating system removed from said power station; said power station comprising a base-load steam turbine, an electric generator coupled to and driven by said base-load turbine for generating a base-load, a gas engine, a peak-load generator connected to and driven by said gas engine for generating a peak-load in excess of said base-load, a condenser for condensing steam discharged from said base-load turbine, a condenser cooling water storage vessel connected to said heating system and to said condenser whereby water from said condenser passes into said vessel and into said heating system, and a heat exchanger connected to said vessel for transferring waste heat from said gas engine to said cooling water whereby waste heat from said gas engine is transferred to said heating system by way of said vessel.

7. A power station according to claim 6 wherein said gas engine is a gas turbine.

8. A power station according to claim 6 wherein said gas engine is separate and spaced from said steam turbine.

* * * * *